United States Patent [19]
Fischer

[11] Patent Number: 5,274,290
[45] Date of Patent: Dec. 28, 1993

[54] ELECTROMAGNETICALLY OPERATED BRAKE

[75] Inventor: Horst Fischer, Ubstadt-Weiher, Fed. Rep. of Germany

[73] Assignee: Sew-Eurodrive GmbH & Co., Bruchsal, Fed. Rep. of Germany

[21] Appl. No.: 928,727

[22] Filed: Aug. 13, 1992

[30] Foreign Application Priority Data

Aug. 13, 1991 [DE] Fed. Rep. of Germany ....... 4126672

[51] Int. Cl.$^5$ .................. H02K 49/00; B60L 7/00; H02P 15/00
[52] U.S. Cl. .......................... 310/93; 310/51; 310/77; 188/161
[58] Field of Search ......... 310/93, 51, 77, 123, 310/273, 76, 92; 188/71.5, 72.3, 161; 192/84 C, 30 V, 90

[56] References Cited

U.S. PATENT DOCUMENTS

| | | | |
|---|---|---|---|
| 3,750,781 | 8/1973 | Lengsfeld | 310/76 X |
| 4,823,926 | 4/1989 | Wittler et al. | 310/76 X |
| 5,004,078 | 4/1991 | Oono et al. | 188/218 A |
| 5,035,305 | 7/1991 | Lammers | 188/71.5 |

FOREIGN PATENT DOCUMENTS

| | | |
|---|---|---|
| 222312 | 11/1986 | European Pat. Off. . |
| 1068637 | 4/1964 | United Kingdom . |
| 1147413 | 7/1967 | United Kingdom . |
| 1315934 | 8/1970 | United Kingdom . |

*Primary Examiner*—Steven L. Stephan
*Assistant Examiner*—E. To
*Attorney, Agent, or Firm*—Antonelli, Terry, Stout & Kraus

[57] ABSTRACT

An electromagnetically operated brake with an armature plate (7) axially movable between a magnet body (2) of an electromagnet (1) and a brake disk (8) is proposed. For reducing operating noise, a metallic damping disk (9) with a plurality of elevations (10) is positioned between the armature plate (7) and the magnet body (2).

20 Claims, 2 Drawing Sheets

ELECTROMAGNETICALLY OPERATED BRAKE

FIELD OF THE INVENTION

The invention relates to an electromagnetically operated brake with an armature disk or plate axially movable between a magnet body of an electromagnet and a brake disk.

BACKGROUND OF THE INVENTION with a brake of the aforementioned type, the brake disk is generally located on the shaft of an engine or motor. The non-rotary armature plate is raisable from the brake disk by the electromagnet, so that the brake disk can then freely rotate with the motor. For braking purposes the electromagnet is deexcited or deenergized, so that the armature plate connected in non-rotary manner to a casing, under the action of helical springs inserted in the magnet body, is pressed for braking purposes against the brake disk. Generally brake linings are provided on the brake disk for improving the braking action. Optionally the brake disk can also be pressed by the armature plate against a casing-fixed bearing surface.

On energizing or de-energization the electromagnet, the armature plate strikes at a relatively high speed against the pole face of the magnet body or on the brake disk, which leads to considerable impact noise. This is more particularly the case with rapidly operating and pulse-magnetized brakes, in which the impact noise occurs to a greater extent as a result of the increased speeds.

Attempts have already been made to reduce the impact noise by making the armature from stacked sheets (DE-OS 22 59 320). In addition, in DE-OS 28 40 565, for reducing the impact noise there are cup springs on the magnet body for decelerating the armature plate. It must be borne in mind that the stacked sheets have a greatly reduced stability as compared with a solid armature plate. In addition, the noise reducing effect through cup springs is limited with stacked sheets and negligible with solid armature plates, so that these solutions are in fact disadvantageous in the case of pulse-magnetized brakes which, as a result of the high speed and forces, require a very stable armature plate.

It is known from German Utility model 89 13 767 to form the armature plate in the case of such a brake from individual metal disks between which is, in each case, arranged a damping material layer. For the same dimensions as a solid armature plate, this construction leads to a significant stability decrease. However, if a stability equivalent to that of a solid armature plate is to be achieved, much greater dimensions are required, which has a disadvantageous effect with rapidly operating brakes.

SUMMARY OF THE INVENTION

The aim underlying the invention is to provide a brake of the aforementioned type, which has highly damping, noise-reducing characteristics and, in particular, makes it possible to use a solid armature plate.

According to the invention a metallic damping disk with a plurality of elevations is positioned between the armature plate and the magnet body. This damping plate or disk significantly reduces the noise produced, if the armature plate is raised from the brake disk by exciting the electromagnet, because now the armature plate no longer strikes directly against the magnet body and instead transfers its kinetic energy to the interposed damping disk. The inventive construction leads to the advantage that solid armature plates can be used. As the damping disk is made from metal, preferably spring steel, it has an adequate stability under high loads and a long service life, so that this type of soundproofing is in particular usable with rapidly operating and pulse-magnetized brakes. Since, in order to bring about the soundproofing according to the invention, the damping disk is merely inserted in a brake, optionally older brakes can be reequipped.

Tests have revealed that very good damping characteristics are obtained when the protuberances or elevations have a frustum-like construction.

Preferably the diameter of a top surface of an elevation is approximately ten to twenty times the damping disk thickness. This leads to favorable damping characteristics and also to simple manufacture by stamping the elevations out of a flat plate.

Another important parameter for the damping characteristics of the damping disk is the pitch angle of the cone-shaped shell. This pitch angle is less than 20° in order to achieve a favorable damping behavior.

A favorable spring behavior in the case of a limited axial extension of the damping disk is obtained in that the height of the elevations corresponds to approximately one to two times the damping disk thickness.

A preferred construction is characterized in that the elevations are arranged in concentric circular arcs coaxial to the damping disk axis. This leads to a uniform distribution, which ensures a uniform damping and shock absorption of the armature plate, which prevents a tilting of the latter on braking.

It has proved adequate to make the damping disk from a 0.1 to 0.3 mm steel sheet.

In order to ensure favorable magnetic characteristics for the armature plate, in one construction the steel sheet is magnetizable and for this purpose use is made of a paramagnetic or ferromagnetic steel. If the damping disk is made from ferromagnetic or paramagnetic steel, then the magnetic resistance of the magnetic circuit is only slightly increased, because the magnetic flux is loss-free in the disk. With antimagnetic materials this corresponds to a larger gap and to an increase in the magnetic resistance and the consequence would be an increase in the magnetic flux of the brake coil.

Preferably the damping disk is made in one piece, which permits simple, inexpensive manufacture. For example, the elevations can be produced by stamping a flat disk.

Preferably, the damping disk is firmly connected to the magnet body or armature plate, e.g. by screws or rivets. This avoids additional chattering noise, which could occur with a freely movable damping disk. When the damping disk is located on the magnet body there are no changes to the armature plate for fixing to the damping disk, such as recesses or bores, whilst the overall dimensions of the armature plate are not increased.

The damping disk has recesses for the passage of connecting parts or springs, which are, for example, provided for fixing the electromagnet to the casing or for pressing the armature plate onto the brake disk.

The damping disk only reduces the operating noise on releasing the brake. In order to bring about a noise reduction on energizing the electromagnet, i.e. on closing the brake, according to a preferred embodiment the brake disk has individual metal disks and between them at least one damping material layer, but the armature plate remains unchanged.

BRIEF DESCRIPTION OF THE DRAWINGS

The invention is described in greater detail hereinafter relative to a non-limitative embodiment and the attached drawings, wherein.

DETAILED DESCRIPTION

Figure 1:
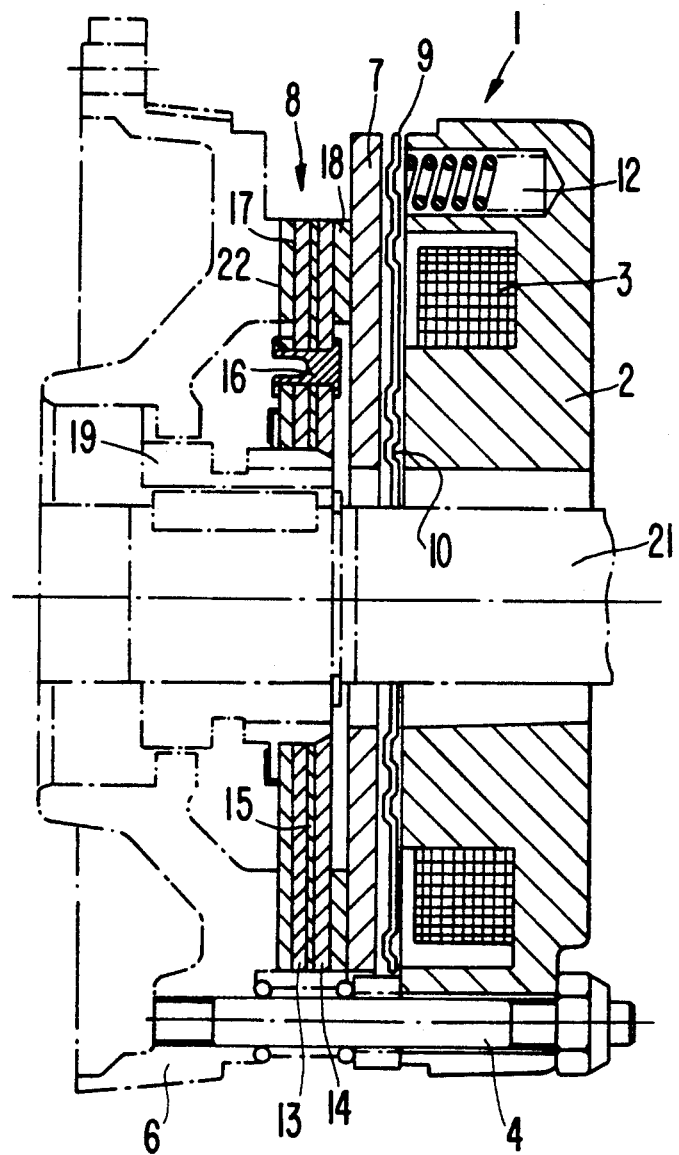
FIG. 1 is a sectional representation of a brake according to the invention.

A brake according to FIG. 1 has an electromagnet 1 with a magnet body 2, in which is fitted an exciting coil 3. The magnet body 2 is fixed by bolts 4 to a stationary casing part 6 of the brake. Between the magnet body 2 and casing part 6 are located an armature plate 7 and a brake disk 8. A damping disk 9 with a plurality of elevations 10 is positioned between the armature plate 7 and the magnet body 2.

In the illustrated embodiment, the armature plate 7 and damping disk 9 are axially movable and are forced away from the electromagnet 1 by helical springs 11 arranged in recesses 12 of the magnet body 2.

The brake disk 8 comprises two metal disks 13,14 between which is located a damping layer 15. The disks 13,14 are interconnected by rivets 16, so that the disks 13,14 are movable on one another, while compressing the layer 15. Each disk 13,14 has brake linings 17,18. By a cam 19 and a shaft 21, the brake disk 8 is connected in non-rotary manner to a motor or engine (not shown).

For releasing the armature plate 7 from the brake disk 8, i.e. for releasing the brake, by a current flow through the coil 3 the electromagnet 1 is excited and, the armature plate 7 and therefore, also the damping disk 9 is moved away from the brake disk 8 counter to the tension of the springs 11 until it strikes against the magnet body 2. The damping disk 9 prevents a direct impact of the armature plate 7 on the magnet body 2 and absorbs the kinetic energy of the armature plate 7 by the elevations 10. As a result, the disconnection noise is greatly reduced. The brake disk 8 is released in this way and the engine can rotate.

For braking the coil 3 of the electromagnet 1 is de-energized, so that the spiral springs 11, the damping disk 9 and the armature plate 7 press against the brake linings 18 of the brake disk 8 and the remote side thereof with the brake disk 17 against a casing-fixed bearing surface 22. The noise caused by the armature plate 7 impacting on the brake disk 8 is significantly damped by the damping layer 15 between the disks 13 and 14 of the armature plate 7. A concomitant rotation of the armature plate 7 is, for example, prevented in that it has recesses 23 through which pass the stationary bolts 4 (FIG. 2).

For damping the switching on noise, there is also a multipart construction of the brake disk 8 with a damping layer 15 as an intermediate layer, such as, for example, a Nomex fleece.

In the represented embodiment the helical springs 11 (only one is shown in FIG. 1) ensure a constant engagement of the damping disk 9 on the armature plate 7, which avoids additional noise by the striking together of the two disks 7 and 9.

Figure 2:
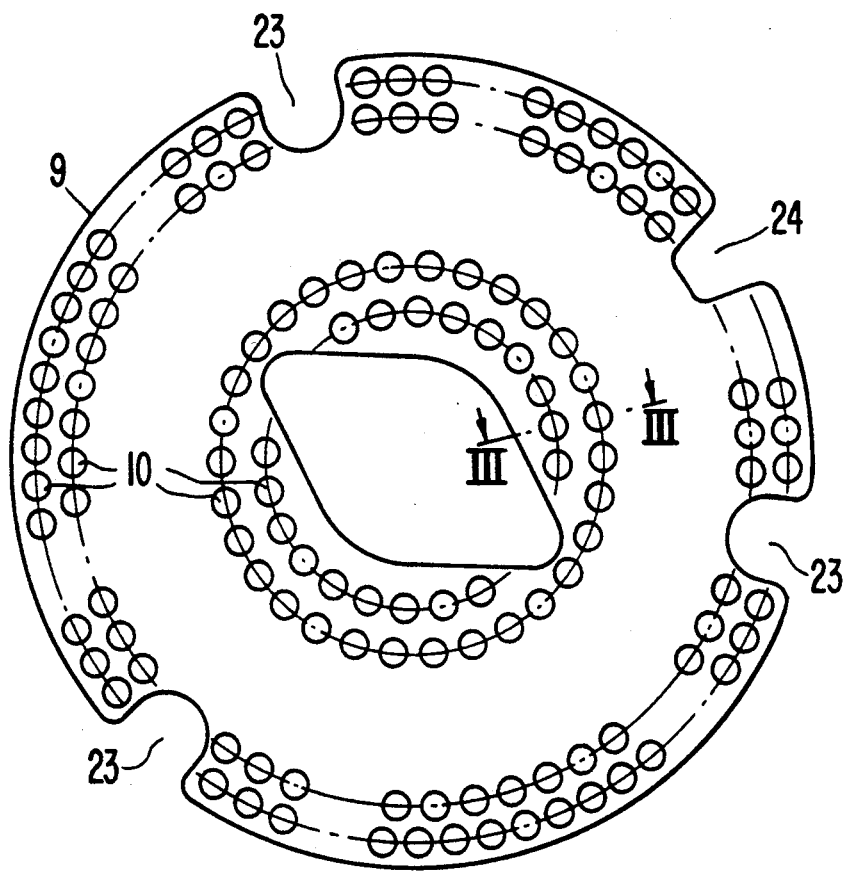
FIG. 2 is a plan view of a damping disk.

FIG. 2 shows in plan view the inventive damping disk 9 according to FIG. 1 with a plurality of elevations 10, which are arranged in concentric circles or arcs around the centre of the disk 9. The disk 9 has marginal recesses 23, through which are passed bolts 4 with the brake assembled. In the construction shown the damping disk 9 is stamped from a spring steel plate and the elevations 10 are stamped in.

Figure 3:
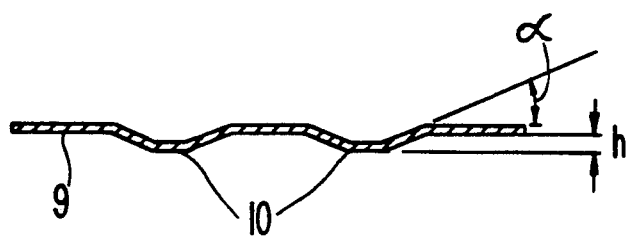
FIG. 3 is a sectional view taken along the line III—III in FIG. 2.

FIG. 3 illustrate two elevations 10 of the damping disk 9 of FIG. 2. The elevations 10 are frustum-shaped and, in the preferred embodiment, not shown true to scale have a pitch angle α of the shell surface of approximately 3°. The height of the elevations 10 corresponds to 1.5 times the thickness of the damping disk 9. It has been found that this construction has very good damping characteristics. In the case of the inventive construction sound pressure level reductions of 15 dB (A), namely from 84 to 69 dB (A) are obtained.

I claim:

1. Electromagnetically operated brake comprising:
an armature plate axially movable between a magnet body of an electromagnet and a brake disk, and a metallic sound damping disk including a plurality of elevations located between the armature plate and the magnet body.

2. Brake according to claim 1, wherein the plurality of elevations are frustum-shaped with beveled surfaces.

3. Brake according to claim 1, wherein the plurality of elevations are constructed as spherical portions.

4. Brake according to one of claims 1 or 2, wherein a diameter of a top surface of the respective elevations corresponds approximately to five to twenty times a thickness of the metallic damping disk.

5. Brake according to claim 2, wherein a pitch angle of the beveled surfaces is less than 20°.

6. Brake according to one of claims 1 or 2, wherein a height of the respective elevations is approximately one to two times a thickness of the damping disk.

7. Brake according to one of claims 1 or 2, wherein the metallic damping disk is produced in one piece.

8. Brake according to one of claims 1 or 2, wherein the damping disk is fashioned of steel sheeting having a thickness of between 0.1 to 0.3 mm.

9. Brake according to claim 8, wherein the steel sheeting is magnetizable.

10. Brake according to one of claims 1 or 2, the metallic damping disk includes recesses for enabling a passage of connecting parts.

11. Brake according to claim 10, wherein the metallic damping disk includes recesses for enabling a passage of springs.

12. Brake according to one of claims 1 or 2, wherein the brake disk includes individual metallic disks.

13. Brake according to claim 12, wherein at least one damping material layer is disposed between the individual metallic disks.

14. Brake according to claim 12, wherein the individual metallic disks of the brake disk are in each case directed towards other individual metallic disks of the brake disc.

15. Electromagnetically operated brake comprising:
an armature plate axially movable between a magnet body of an electromagnet and a brake disk, and a metallic damping disk including a plurality of elevations located between the armature plate and the magnet body, and
wherein the elevations are arranged in concentric circular arcs coaxial to a center axis of the damping disk.

16. Brake according to claim 15, wherein the elevations are frustum-shaped with beveled surfaces.

17. Brake according to claim 16, wherein a pitch angle of the beveled surface is less than 20°.

18. Brake according to claim 15, wherein the elevations are constructed as spherical portions.

19. Brake according to claim 15, wherein a diameter of a top surface of the individual elevations corresponds approximately to five to twenty times a thickness of the metallic damping disk.

20. Brake according to claim 15, wherein a height of the respective elevations is approximately one to two times a thickness of the damping disk.

* * * * *